US007996480B2

(12) United States Patent
Fleck et al.

(10) Patent No.: US 7,996,480 B2
(45) Date of Patent: *Aug. 9, 2011

(54) LOW POWER EMAIL FUNCTIONALITY FOR AN ELECTRONIC DEVICE

(75) Inventors: Rod G. Fleck, Bellevue, WA (US); Rex Antony Flynn, Newton, MA (US); Martin J. Kee, Sammamish, WA (US); Stephen L. Perrin, Lake Forest Park, WA (US)

(73) Assignee: Vulcan Portals Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,577

(22) Filed: Mar. 16, 2010

(65) Prior Publication Data

US 2010/0174796 A1 Jul. 8, 2010

Related U.S. Application Data

(63) Continuation of application No. 10/871,870, filed on Jun. 17, 2004, now Pat. No. 7,702,733.

(60) Provisional application No. 60/504,165, filed on Sep. 18, 2003.

(51) Int. Cl.
*G06F 15/16* (2006.01)

(52) U.S. Cl. ........ 709/206; 709/203; 709/204; 709/205; 709/223; 455/571; 455/572; 455/573; 455/574

(58) Field of Classification Search .................. 709/203, 709/223, 224, 204, 205, 206; 713/323; 455/566, 455/571–574

See application file for complete search history.

(56) References Cited

U.S. PATENT DOCUMENTS

| 5,361,397 A | 11/1994 | Wright |
| 5,560,022 A | 9/1996 | Dunstan et al. |
| 5,763,960 A | 6/1998 | Ceccherelli et al. |
| 5,768,164 A | 6/1998 | Hollon, Jr. |
| 5,978,923 A | 11/1999 | Kou |

(Continued)

FOREIGN PATENT DOCUMENTS

EP 0945778 A2 9/1999

(Continued)

OTHER PUBLICATIONS

Strietelmeier, Julie, "Official Gadgeteer Hands on Review: RIM BlackBerry 950 Internet Edition," XP002322212, Feb. 26, 2001. Retrieved fromInternet, URL: http://www.the-gadgeteer.com/rim-blackberry-review.html, download date of Mar. 8, 2005.

*Primary Examiner* — Thu Ha T Nguyen
(74) *Attorney, Agent, or Firm* — Perkins Coie LLP

(57) ABSTRACT

Low power email capabilities are provided for an electronic device, such as a hand-held portable computer having capability to operate an application during a low power mode. During the low power mode, portions of hardware, software, services, and/or other components of the portable computer that are not necessary for email-related operations, such as polling a server for new email, are suspended or otherwise deactivated. At least a portion of a new email is stored in a memory of a low power display module (LPDM) of the portable computer. The LPDM is provided with its own low-power processing unit, user interface, and other components to allow access to and manipulation of the stored email while other components of the portable computer remain deactivated.

20 Claims, 8 Drawing Sheets

U.S. PATENT DOCUMENTS

| | | | |
|---|---|---|---|
| 6,088,809 A | 7/2000 | Atkinson | |
| 6,243,819 B1 | 6/2001 | Jung et al. | |
| 6,246,875 B1 * | 6/2001 | Seazholtz et al. | 455/432.1 |
| 6,760,851 B2 | 7/2004 | Teshima et al. | |
| 6,839,231 B2 | 1/2005 | Fleck et al. | |
| 6,912,664 B2 | 6/2005 | Ranganathan et al. | |
| 6,931,555 B2 | 8/2005 | Osborn | |
| 6,976,180 B2 | 12/2005 | Cupps et al. | |
| 6,977,811 B1 | 12/2005 | Fleck et al. | |
| 7,376,913 B1 | 5/2008 | Fleck et al. | |
| 7,426,647 B2 | 9/2008 | Fleck et al. | |
| 7,500,127 B2 | 3/2009 | Fleck et al. | |
| 7,702,733 B2 | 4/2010 | Fleck et al. | |
| 2002/0087225 A1 | 7/2002 | Howard | |
| 2002/0173344 A1 | 11/2002 | Cupps et al. | |
| 2003/0023700 A1 | 1/2003 | Swinton et al. | |
| 2003/0149904 A1 | 8/2003 | Kim | |
| 2004/0003225 A1 | 1/2004 | Cheng et al. | |
| 2004/0130870 A1 | 7/2004 | Fleck et al. | |
| 2005/0240417 A1 * | 10/2005 | Savage | 705/1 |
| 2006/0129861 A1 * | 6/2006 | Kee et al. | 713/323 |
| 2006/0271678 A1 * | 11/2006 | Jessup et al. | 709/224 |
| 2008/0201419 A1 * | 8/2008 | Hung et al. | 709/204 |
| 2009/0300391 A1 * | 12/2009 | Jessup et al. | 713/323 |
| 2010/0167787 A1 * | 7/2010 | Weisbrod | 455/566 |
| 2010/0218108 A1 * | 8/2010 | Crabtree et al. | 715/738 |
| 2010/0332373 A1 * | 12/2010 | Crabtree et al. | 705/37 |
| 2011/0055434 A1 * | 3/2011 | Pyers et al. | 710/14 |

FOREIGN PATENT DOCUMENTS

| | | |
|---|---|---|
| EP | 1028425 | 8/2000 |
| WO | WO-03029945 A1 | 4/2003 |

* cited by examiner

LOW POWER EMAIL FUNCTIONALITY FOR AN ELECTRONIC DEVICE

CROSS REFERENCE TO RELATED APPLICATIONS

The present application is a continuation of U.S. patent application Ser. No. 10/871,870, entitled "LOW POWER EMAIL FUNCTIONALITY FOR AN ELECTRONIC DEVICE," filed Jun. 17, 2004, which claims the benefit under 35 U.S.C. §119(e) of U.S. Provisional Patent Application Ser. No. 60/504,165, entitled "SOFTWARE AND HARDWARE FEATURES FOR MINI-PC," filed Sep. 18, 2003, assigned to the same assignee as the present application, both of which are incorporated by reference in their entireties.

TECHNICAL FIELD

The present disclosure relates generally to electronic devices, and in particular but not exclusively, relates to a low power email functionality for an electronic device, such as a hand-held portable computer, having the capability to run applications while in a low power mode.

BACKGROUND INFORMATION

Today's computer users are highly mobile individuals. Whether on business trips, on vacations, or coming to and from work, these individuals are readily identifiable by their use of laptops, enhanced-functionality cellular telephones, Palm Pilots™, Blackberries™, and other portable electronic devices. Indeed, many establishments provide Internet connections that cater to individuals who may be merely passing through the establishment for a short period of time and who require a network connection. For instance, Internet connections are available at airports and hotels, and even in restaurants and coffee shops.

Because of the portable nature of the electronic devices, there are certain limits to their capabilities. Power consumption is one of the prime examples. Power consumption is generally a minor issue in an operating environment where the user has "plugged" the electronic device into an electrical power outlet or has docked the electronic device into a docking station. In these situations, there is constant and substantially unlimited power for operating the electronic device, thereby eliminating the need for the electronic device to consume power from an internal power source, such as an internal battery, while plugged in.

However despite the proliferation of establishments that provide Internet connections (and typically a corresponding stationary power supply), there are still many instances when a stationary power supply is unavailable to the highly mobile user. In these instances, the electronic device needs to rely on its internal battery to supply the power necessary to run applications or to perform other functions with the electronic device.

If operated in a full power mode using power from the internal battery, the electronic device can generally operate for only a few hours before the battery is drained. In fact, many different software services, software applications, and hardware can run concurrently in the full power mode using various subsystems and components in the electronic device. A display, disk drive, and processor (especially a graphics processor) are some of the components of an electronic device that can run concurrently, yet consume a substantial amount of power.

To help reduce power consumption, especially when a stationary power supply is unavailable, many electronic devices include a "standby" mode in which the electronic device turns OFF and/or substantially reduces power to all of its subsystems and components. In such a standby mode, a user generally cannot use any applications unless the electronic device is switched from the standby mode to the full power mode. As such, it can often be necessary for the user to make only limited and very efficient use of the electronic device while it is in full power mode when there are no available stationary power supplies. Furthermore, it may even be necessary for the user to keep the electronic device completely turned off or in a substantially non-functional standby mode as much as possible.

If the user fails to diligently conserve power in this manner, then the electronic device will run out of power and become unusable until the user can recharge or replace the internal battery and/or connect to a stationary power supply. For instance, repeatedly accessing a hard disk drive when running applications can dramatically reduce the amount of available power that can be delivered from an internal battery. The constant need for software applications to access the hard disk drive is an important reason for limiting or eliminating the functionality of the applications in the standby mode. This constrained operating environment is inconvenient and impractical for a highly mobile user who may wish to use a portable electronic device for certain applications, such as email, when there are no available stationary power supplies.

BRIEF SUMMARY OF THE INVENTION

One preferred aspect provides a method usable for an electronic device that can operate in a low power mode. The method includes monitoring for an event representative of a transition to the low power mode. If the event is detected, the method activates an email component to operate during the low power mode. The email component is used to obtain at least a portion of an email during the low power mode. The method loads in a memory the portion of the email, and presents the loaded portion of the email from the memory.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
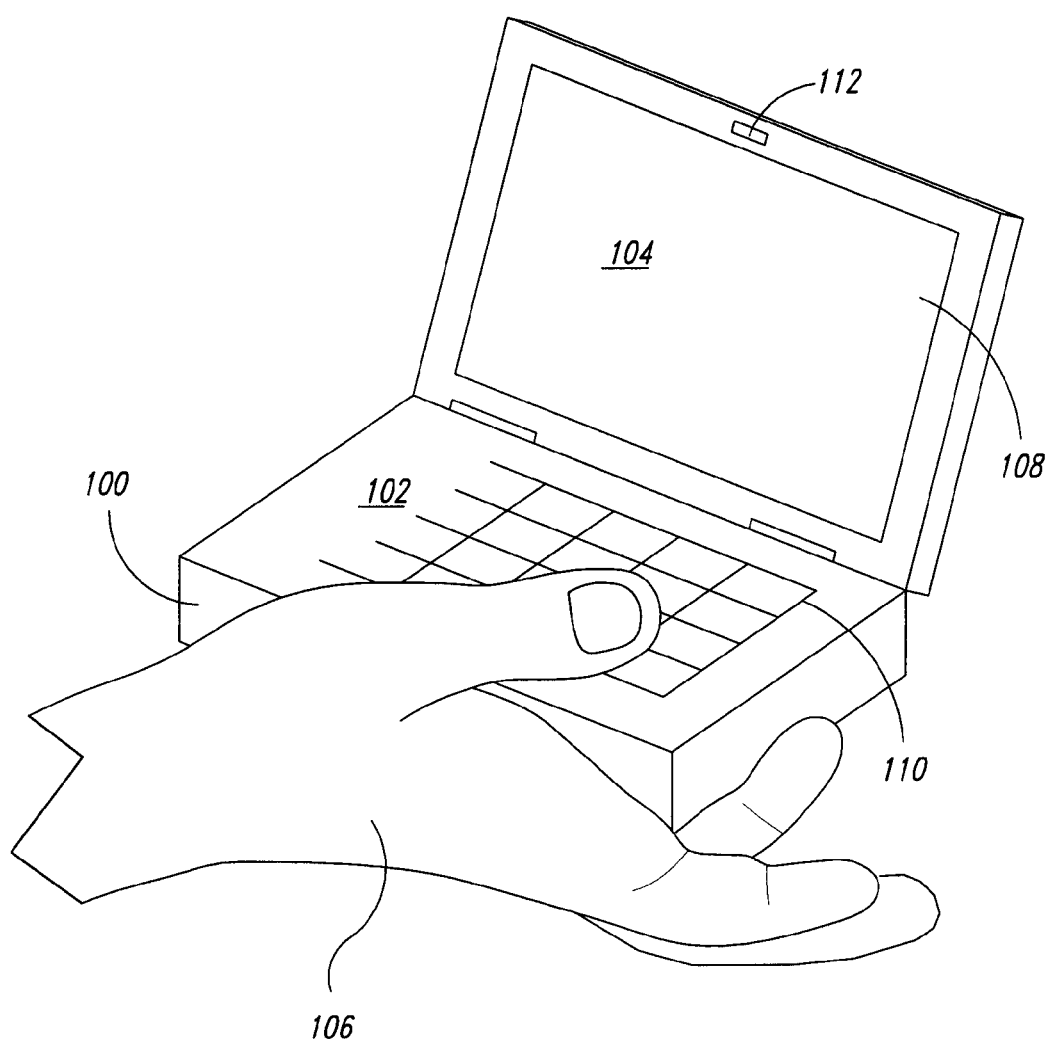
FIG. 1 is a front, top right isometric view of an example electronic device, which in this case is in the form of a hand-held portable computer including a lid shown in an open position.

Embodiments of techniques to provide low power email functionality for an electronic device, for example, a portable electronic device in the form of a hand-held portable computer are described herein. In the following description, numerous specific details are given to provide a thorough understanding of embodiments. The invention can be practiced without one or more of the specific details, or with other methods, components, materials, etc. In other instances, structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment provides low power email functionality for an electronic device having the capability to operate an application during a low power mode. A non-limiting example of such an electronic device is a portable electronic device. The electronic device, according to one embodiment, comprises a hand-held portable computer. The low power email functionality can be provided when the portable computer is in a low power mode. In this low power mode, most of the applications, services, devices, processes, and other components of the portable computer are turned OFF or otherwise powered down. However, certain components (and the resources needed to support their operation) can be selectively kept powered during the low power mode.

One such component is an email synchronization component that can operate during the low power mode in conjunction with an email application. In an embodiment, emails are cached or otherwise stored locally in a first storage location of the portable computer by the email application while the portable computer is operating at a full power mode. During a synchronization process, the emails stored in the first storage location are copied to a second storage location by the email synchronization component, wherein the second storage location can comprise a cache or other memory located in a low power display module (LPDM) of the portable computer. The synchronization may be performed during the full power mode, low power mode, or other operative power mode by the email synchronization component. In an embodiment, the LPDM is integrated on a lid of the portable computer, and can include its own operating system, low power processing unit, application(s), user interface, communication devices, and/or other components.

When the lid of the portable computer is closed, the portable computer enters into a standby power mode or other similar power state. During specific time intervals, the portable computer "wakes up" from the standby power mode and enters into the low power mode. During the low power mode, hardware and/or software components associated with the email synchronization component and/or the email application are activated such that the portable computer can poll for new email. That is, according to one embodiment, certain components that are usable for polling or otherwise checking for new email are selectively and/or sequentially activated. If there is any new email, this new email is downloaded or otherwise stored in the second storage unit in the LPDM. The user can then read older previously cached emails and/or any newly downloaded emails via the user interface of the LPDM, after the download is complete and the portable computer has returned to the standby power mode.

In one embodiment, the components associated with a high power processing unit, the associated operating system, communication device, email application, and/or other components in the portion of the portable computer external to the LPDM are activated during the low power mode to perform the polling for new email. If there is new email, this new email is provided to the LPDM for presentation on a user interface of the LPDM using the low-power processing unit of the LPDM.

In another embodiment, components of the LPDM (such as its low-power processing unit, operating system, communication device, and/or other components) are used to perform the email polling and other email-related operations. In yet another embodiment, a combination of components in both the LPDM and in the portion of the portable computer external to the LPDM can be activated during the low power mode to perform email polling and/or other email-related operations.

In one embodiment, the low power mode is applicable to the high-power processing unit in that this high-power processing unit enters the low power mode to poll for new email, perform synchronization, and/or other email-related operations. The low-power processing unit is generally in either an active or inactive power state, irrespective of the particular operating power mode of the high-power processing unit. The low-power processing unit transitions into its active power state, for example: 1) if the LPDM is used to present downloaded emails, 2) if/when the LPDM performs the email polling, 3) if synchronization is being performed, or 5) if other email-related operations involving the LPDM are performed and while the high-power processing unit is in a reduced power mode (such as either or both the standby or low power modes). The low-power processing unit can be inactive otherwise.

During operation of the portable computer in the low power mode, hardware, software, services, and other components of the portable computer that are not necessary for email-related operations are suspended or otherwise deactivated. Furthermore, as each email-related task is performed, the components that are not needed for subsequent tasks are deactivated and reactivated as needed. The various deactivation operations can be performed in sequence from the highest-level components to the lowest-level components to ensure that components that are needed by other components, or that are otherwise involved in operating dependencies with other components, are not prematurely deactivated. A specific set of events can transition the portable computer out of the low power mode into some other operating mode, such as the full power mode.

By using the low power mode to poll and retrieve emails at particular time intervals and using only activated components relevant to such operations while keeping other components deactivated, power consumption for the portable computer 100 can be reduced. Moreover, by using the low-power processing unit to present information related to such emails (such as inbox listings, email portions, etc.) on the user interface of the LPDM, power consumption is reduced as compared to using the high-power processing unit and main display at full operating power to perform such activities.

Figure 2:
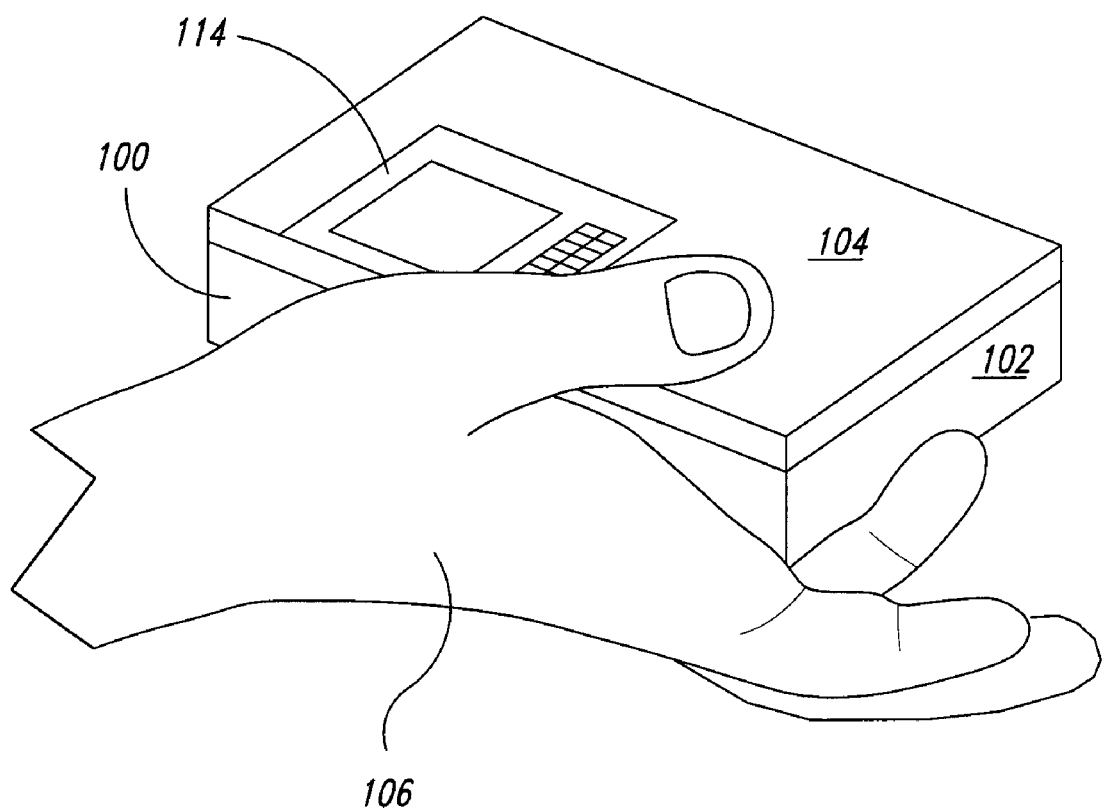
FIG. 2 is a front, top right isometric view of the example portable computer of FIG. 1 including the lid shown in a closed position.

FIGS. 1-2 show front, top right isometric views of an example electronic device, in this case a hand-held portable computer 100 in which an embodiment may be implemented. While the portable computer 100 is used as the illustrative example throughout this application, other embodiments may be implemented with devices that may not necessarily be thought of as a "computer" or with devices that may not necessarily have the same shape and appearance as the portable computer 100 illustrated in FIGS. 1-2. Examples include but are not limited to wireless communication devices, display devices, monitors, audiovideo equipment, consumer electronic devices, or other electronic devices that can implement applications that are usable during a low power mode.

As shown, the portable computer 100 is similar in appearance to a laptop computer, in that it comprises first and second portions 102 and 104, respectively, which are hinged. The first portion 102 can include a keypad or keyboard 110 and housing for the internal electronic components (such as one or more processors, machine-readable storage media, graphics drivers, and so forth). The second portion 104 operates as a lid that folds over the first portion 102 (when in a closed position, such as shown in FIG. 2), and includes a display screen 108 for displaying information or for otherwise presenting data (such as emails, user interfaces, graphics, and the like) while the second portion 104 is unfolded to an upright position as shown in FIG. 1.

Unlike a conventional laptop computer, however, the portable computer 100 of one example embodiment is substantially smaller in size in terms of both volume and weight. For example, the portable computer 100 may be 140 mm long, 101 mm wide, and 30 mm thick (while closed), with a weight of approximately one pound. The display screen 108 on the second portion 104 may have a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIGS. 1-2, the portable computer 100 has a size such that it can be held securely in a hand 106 of a user whether in the open or closed position. In another embodiment, the portable computer 100 may have a larger or otherwise different form factor and/or have a greater weight.

In one specific embodiment shown in FIG. 2, the portable computer 100 can include a low power display 114 integrated within the second portion 104. In such an embodiment, the low power display 114 be used to present certain information (such as email) while the lid of the portable computer 100 is closed and the portable computer 100 is in the low power mode, or be used to present other forms of data. The low power display 114 also includes a user interface through which the user can interact with low power mode applications (such as an application that presents an email inbox), trigger the portable computer 100 to transition to the low power mode, and other operations. For example, the low power display 114 can present an email inbox, email folders, email commands/menus, calendar and task information, or other information usable with an email application. In an embodiment, the low power display 114 and its associated user interface (as well as other components of the second portion 104) can be integrated as part of the LPDM.

While the low power display 114 is depicted in FIG. 2 as being positioned on the surface of the second portion 104, the low power display 114 may be positioned elsewhere on the portable computer 100. For example, the low power display 114 may be positioned on side surfaces, the bottom surface, or any combination of surfaces of the portable computer 100.

In one embodiment that will be described below, the portable computer 100 of FIG. 1 includes a lid switch 112. The lid switch 112 operates as a type of trigger to indicate whether the lid of the portable computer 100 is open or closed. Thus, for example, when the lid of the portable computer 100 is closed as shown in FIG. 2, the lid switch 112 can make physical contact with an electromechanical connection, can change orientation, can be depressed, or experience any other type of change in state that causes a signal such as an interrupt to occur. Such an interrupt can be used by an operating system, a basic input/output system (BIOS), a service, or other software component to initiate a transition from one power state to another power state (e.g., to the low power mode). The lid switch 112 can be embodied with any suitable shape, mechanism, functionality, or other operating feature.

Examples of the portable computer 100 in which embodiments of the low power mode email techniques may be implemented are disclosed in U.S. patent application Ser. No. 10/338,802, entitled "SYSTEM AND METHOD FOR HEAT REMOVAL FROM A HAND-HELD PORTABLE COMPUTER WHILE DOCKED"; U.S. patent application Ser. No. 10/338,815, entitled "NAVIGATION AND SELECTION CONTROL FOR A HAND-HELD PORTABLE COMPUTER"; U.S. patent application Ser. No. 10/338,761, entitled "HEAT DISSIPATION FROM A HAND-HELD PORTABLE COMPUTER"; and U.S. patent application Ser. No. 10/338,791, entitled "KEYBOARD WITH MOUSE FOR A HAND-HELD PORTABLE COMPUTER", all filed Jan. 7, 2003, assigned to the same assignee as the present application, and all of which are incorporated herein by reference in their entireties. Also assigned to the same assignee and incorporated by reference are U.S. application Ser. No. 10/857,628, entitled "METHOD AND APPARATUS FOR OPERATING AN ELECTRONIC DEVICE IN A LOW POWER MODE," and U.S. application Ser. No. 10/857,627, entitled "LOW POWER MEDIA PLAYER FOR AN ELECTRONIC DEVICE," both of which were filed May 28, 2004 and which disclose low power mode-related embodiments.

Figure 3:
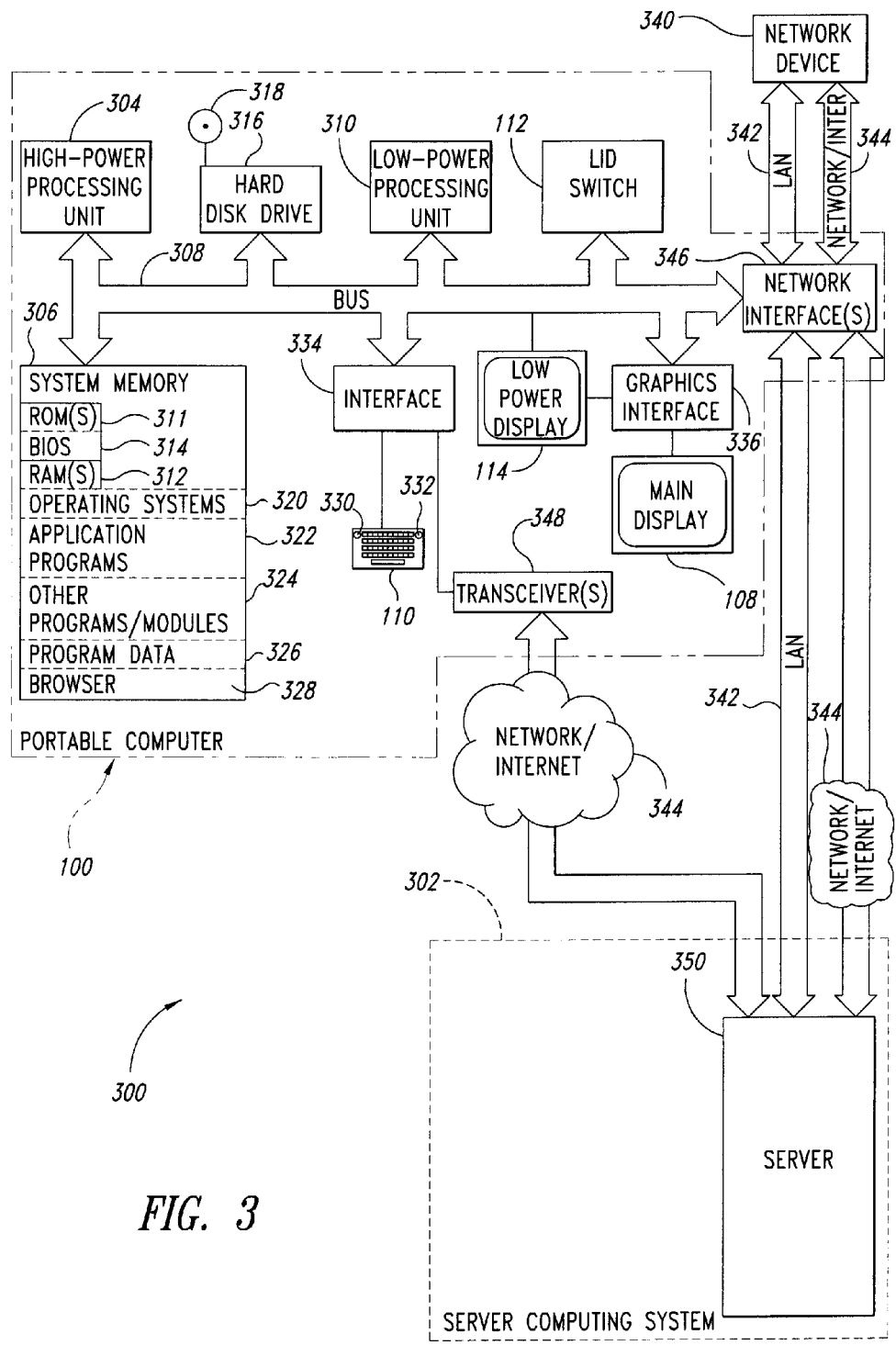
FIG. 3 is a block diagram of an embodiment of the portable computer and a representative operating environment in more detail.

FIG. 3 and the accompanying discussion provide a description of a suitable computing environment in which embodiments can be implemented. Although not required, embodiments will be described in the general context of hardware and computer-executable instructions, such as program application modules, objects, drivers, services, or macros being executed by a computer (such as by the portable computer 100). In addition to the embodiment shown in this figure, other embodiments can be practiced with other computer systems and/or network configurations.

FIG. 3 shows a computing system 300, and in particular shows an embodiment of the portable computer 100 in more detail. The computing system 300 includes the portable computer 100 and a server computing system 302. The server computing system 302 may be located at one or more network locations, for example, at one or more Internet Service Provider (ISP) locations to store and serve email information and to serve other information for the portable computer 100.

The portable computer 100 includes a high-power processing unit 304 for high-power processing, at least one system memory 306, and a system bus 308 that couples various system components, including the system memory 306, to the high-power processing unit 304. The high-power processing unit 304 may be any logic processing unit, such as one or more central processing units (CPUs), digital signal processors (DSPs), graphics processors, application-specific integrated circuits (ASICs), etc.

In an embodiment, the portable computer 100 may also include a low-power processing unit 310 for low power processing, and which may or may not necessarily operate with the same operating system as the high-power processing unit 304. For example, in one embodiment separate operating systems, memory, applications, or other components can be provided for the high-power processing unit 304 and for the low-power processing unit 310. It is also possible in an embodiment for the high-power processing unit 304 and for the low-power processing unit 310 to share certain components, rather than having separate dedicated components. In an embodiment, the LPDM integrated in the second portion 104 of the portable computer 100 can include or be otherwise operatively coupled to the low-power processing unit 310 and/or to other components.

The system bus 308 can employ any suitable bus structure or architecture, including a memory bus with memory controller, a peripheral bus, and a local bus. The system memory 306 may include one or more read-only memories (ROMs) 311 and one or more random access memories (RAMs) 312. In one embodiment, separate ROM 311, RAM 312, and/or other memory can be dedicated for the low power display 114. For example, separate memory (such as a cache, ROM, RAM, and the like) can be provided in the LPDM such that emails can be stored in that memory and accessed (and manipulated) during the low power mode. For the sake of simplicity of illustration and explanation, the various memories and/or other components that can be provided additionally/separately for the LPDM are depicted in FIG. 3 as single units (but nevertheless labeled in the plural sense).

A BIOS 314, which can be stored in the ROM 311, contains routines that help transfer information between elements within the portable computer 100, such as during start-up. Operation of an embodiment of the BIOS 314 in connection with a low power mode will be described in further detail below.

The portable computer 100 may include a hard disk drive 316 for reading from and writing to a hard disk 318. The hard disk drive 316 communicates with the high-power processing unit 304 via the system bus 308. The hard disk drive 316 may include interfaces or controllers (not shown) coupled between such drive(s) and the bus 308. The hard disk drive 316 and its associated hard disk 318 provide nonvolatile or otherwise persistent storage of computer readable instructions, data structures, program modules and other data for the portable computer 100. Although the depicted portable computer 100 employs the hard disk drive 316 and the hard disk 318, other types of drives and computer-readable media that can store data accessible by a computer may be employed, such as compact disks (CDs), magnetic cassettes, flash memory cards, digital video disks (DVDs), Bernoulli cartridges, RAMs, ROMs, smart cards, etc. In one embodiment, the hard disk drive 316 and/or other drives are not integrated within a housing of the portable computer 100 itself, but instead are external devices that are accessible via hardwire or wireless communication interfaces.

The system memory 306 can be used for storing various program modules, such as one or more operating systems 320, one or more application programs 322 (such as an email program or other applications that can operate in a high power mode or in a low power mode), other programs or modules 324, and program data 326. For simplicity of illustration, the system memory 306 is shown in FIG. 3 as a single unit with multiple component parts. While illustrated as such, this example illustration is also intended to cover an embodiment wherein the second portion 104 of the portable computer 100 (or more particularly the LPDM integrated in the second portion 104) includes its own system memory 306, RAM 312, operating system 320, and the like.

A non-limiting example of an operating system 320 that may be used is Windows XP™, which is commercially available from Microsoft Corporation of Redmond, Wash. Windows XP™ as well as other suitable operating systems used with certain embodiments may include a power management subsystem. In an embodiment, power management capabilities are provided in connection with the low power mode that supplements power management provided by the power management subsystem of the operating system 320.

The other programs/modules 324 can include libraries, application program interfaces (APIs), objects, or other components. The program data 326 can include cached data, such as cached emails or other types of files, in one embodiment. As such, parts of the system memory 306 provide volatile or otherwise non-persistent memory capability, (such as an operating system cache, the RAM 312, or other cache or non-persistent storage location) for storing emails.

The program data 326 can be stored as a data structure, file, or other data format in a cache, database, or other storage unit integrated in or separate from the system memory 306. In one embodiment, the program data 326 also includes power profiles and other power management data indicative of the power requirements of particular services, software, and hardware of the portable computer 100. As will be described later, this power management data is used in one embodiment to determine which component of the portable computer 100 to keep ON or to turn OFF during the low power mode, length of time to keep ON or OFF, sequence of turning various components ON or OFF, and other parameters and settings. Further detailed discussion of the various other programs/modules 324 that interact for managing and controlling operations in the low power mode and of the application program 322 (and more specifically, some type of suitable low power mode application program or component) will be provided below.

The portable computer 100 may also include a web browser 328 for permitting the portable computer 100 to access and exchange data with sources such as Internet web sites, corporate intranets, extranets, and/or other networks as described below, as well as other server applications on server computers. For purposes of clarity the browser 328 is shown separately in FIG. 3. According to various embodiments, the browser 328 can comprise one of the application programs 322, one of the other programs/modules 324, and/or may be integrated in some manner with the operating system(s) 320. While shown in FIG. 3 as being stored in the system memory 306, the operating systems 320, application programs 322, other programs/modules 324, program data 326, and browser 328 can be stored on the hard disk 318 of the hard disk drive 316 and/or other computer-readable media in another embodiment.

Moreover and as discussed above, the various elements depicted as being stored in the system memory 306 need not necessarily reside on the same physical memory. For example, in embodiments where the low-power processing unit 310 and the low power display 114 comprise part of the LPDM that can be operatively detached from the portable computer 100 or otherwise operate independently of other components of the portable computer 100, separate memory (having an operating system, RAM, ROM, applications, and other elements stored thereon) can be operatively decoupled from the portable computer 100 along with the low-power processing unit 310 and the low power display 114. In this manner, the LPDM can be used during the low power mode to present emails that have been cached in the LPDM.

A user can enter commands and information into the portable computer 100 through one or more input devices (such as the keyboard 110) and a pointing device (such as a mouse 330 that may be, for example, built into the keyboard 110, an example embodiment of which is disclosed in U.S. patent application Ser. No. 10/338,791), or through such other types of devices usable for providing user input. Alternatively or additionally, the mouse 330 can be embodied as a touch pad as compared to physical buttons. Another input device may take the form of one or more buttons 332 on the side of the keyboard 110, with the button(s) 332 usable for scrolling and clicking via turning and pressing of the button(s) 332. Other possible input devices can include a microphone, joystick, game pad, scanner, etc. (not shown). These and other input devices are connected to the high-power processing unit 304 through an interface 334 such as a serial port interface that couples to the bus 308, although the portable computer 100 may employ other interfaces such as a parallel port, a game port or a wireless interface or a universal serial bus (USB). The interface 334 can be any suitable communication interface to the bus 308 and need not necessarily be a port per se. In one embodiment, the input devices such as a mouse, joystick, game pad, keyboard, etc. are integrated directly into the housing of the portable computer 100, rather than or in addition to being coupleable via a serial or parallel port interface.

The display screen 108 operates as the main display and is coupled to the bus 308 via a graphics interface 336, such as a video adapter or other graphics component that will allow video and other graphics to be rendered on the display screen 108. The low power display 114 (and its associated user interfaces) may also be present in one embodiment to allow presentation of data (e.g., presentation on the outside surface of the second portion 104 of the portable computer 100) during the low power mode, when the lid is closed on the portable computer 100. The low power display 114 may be coupled to the bus 308 by way of the graphics interface 336 (or other interface) or may be directly coupled to the bus 308. The low power display 114 can provide its user interface with various controls, such as buttons and menus, which may be used to control various aspects of email-related operations during the low power mode, such as reading, deleting, or saving emails. Also as depicted in FIG. 3, the lid switch 112 can be coupled to the system bus 308 to allow the various components of the portable computer 100 to detect and respond to a closing or opening of the lid of the portable computer 100.

The portable computer 100 can operate in a networked environment using logical connections to one or more remote computers and/or devices external to the portable computer 100, such as the server computing system 302 and a network device 340, such as a printer or network storage unit. The portable computer 100 is logically connected to one or more remote computing systems or devices under any suitable method of permitting computers to communicate, such as through a wireless local area network (WLAN) 342, a wireless wide area network (WWAN), or any other network 344, including wired and wireless networks that use or can communicate with the Internet (e.g., World Wide Web). Various embodiments can be implemented to communicate with several types of communication networks, including but not limited to, telecommunications networks, cellular networks, paging networks, wired and wireless enterprise-wide computer networks, intranets, extranets, the Internet, and other types of networks. Examples of wireless systems and protocols with which the portable computer 100 can communicate, include but are not limited to, Wi-Fi, Bluetooth, 802.11, and others.

When used in a LAN networking environment, the portable computer 100 can be connected to the LAN 342 through one or more adapters or network interfaces 346 (communicatively linked to the bus 308). In an embodiment, separate network interfaces 346 can be provided for use by the high-power processing unit 304 and for use by the low-power processing unit 310 in the LPDM. When used in a WWAN or other network 344, the portable computer 100 may include one or more modems, transceivers 348 or other devices, such as the network interface 346, for establishing communications over this networking environment or for otherwise communicating with external devices. The transceiver 348 as shown in FIG. 3 is communicatively linked between the interface 334 and the network 344. The transceiver 348 may be one or more transmitters, receivers, or other communication devices that are compliant with, for example, 802.11, GPS, Bluetooth, cellular (TDMA, FDMA, and/or CDMA), Wi-Fi, virtual private network (VPN), and/or other communication standards or techniques. In an embodiment, a separate transceiver 348 can be provided for the LPDM.

In one embodiment, the portable computer 100 is communicatively linked to the server computing system 302 through the LAN 342 and/or the network 344 with transmission control protocol/Internet protocol (TCP/IP) middle layer network protocols or other network protocol layers, such as User Datagram Protocol (UDP). The network connections shown in FIG. 3 are only some examples of establishing communication links between computers, and other links can be used, including both hardwire and wireless links.

The server computing system 302 includes one or more servers 350. In the context of email, the server 350 can comprise an email server. An example of such a server is a Microsoft Exchange™ server, and the principles described herein are not to be limited to only email implementations that use a Microsoft Exchange™ server.

Figure 4:
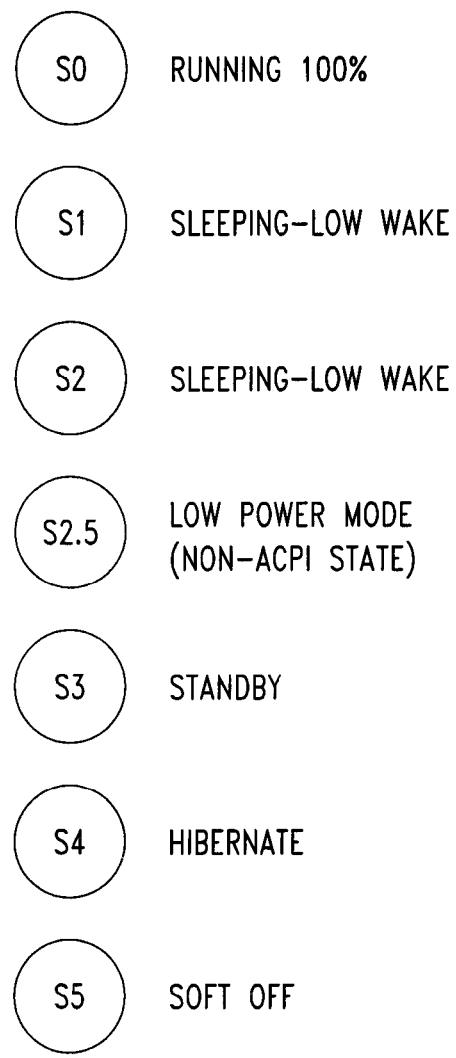
FIG. 4 is a diagrammatic representation of power states in accordance with one embodiment.

FIG. 4 is a diagrammatic representation 400 of power states in accordance with one embodiment. More particularly, FIG. 4 shows operating power states S0-S2 and S3-S5 that are supported by the Advanced Configuration and Power Interface (ACPI) specification and a non-ACPI-defined low power mode state S2.5 in accordance with one embodiment. Typically, the S0-S2 and S3-S5 power states are defined in power profiles that are integrated as part of a power management subsystem (such as a Windows power management subsystem) in the operating system 320. For the sake of brevity, only a summary of the ACPI power states will be provided herein. Further details of the ACPI power states can be found in Compac Computer Corporation et al., "Advanced Configuration and Power Interface Specification," Revision 2.0c, Aug. 25, 2003. Moreover, another embodiment of the invention can be based on power states that are not necessarily compliant with the ACPI specification.

In the S0 power state, the high-power processing unit 304 is executing instructions at its full clock speed, and the portable computer 100 is otherwise operating at substantially full (e.g., 100%) capacity. For instance, many services are operational and performing their tasks, data is being written to and read from the hard disk drive 316, the main display screen 108 is rendering content, and other working state tasks are being performed.

The S1 power state is a sleeping-low wake mode. In the S1 power state, the high-power processing unit 304 (or other processing unit) is not executing instructions. Processor context is maintained, and all system clocks and memory are in refresh. The S2 power state is also a sleeping-low wake mode that is logically lower than the S1 power state, and is assumed to conserve more power. The processor context is not maintained, and the clock of the high-power processing unit 304 is stopped. Moreover, all system clocks, cache(s) and memory are in refresh, and all power resources that supply a system-level reference of S0 or S1 are in the OFF state. The S1 and S2 power states are low wake modes in that any interrupt (such as the pressing of a key on the keyboard 110) generally awakens or transitions the portable computer 100 from these modes.

The S3 power state is a standby mode and is logically a lower power state than the S2 power state. Memory is continuously running and refreshed, and so the data context of the RAM 312 is maintained, for instance. However, the high-power processing unit 304, components associated with the graphics system, the hard disk drive 316, the main display screen 108, and other components of the portable computer 100 are turned OFF and no services are running. In one embodiment, a few specific actions awaken the portable computer 100 from the S3 power state, such as pressing a power button, opening the lid of the portable computer 100 (thus activating the lid switch 112), and the receipt of a wake-on-LAN/USB/fax signal.

In the S4 power state, the portable computer 100 is in a hibernate mode. The data context of the RAM 312 is not maintained, and most components are turned OFF and not running. The S5 power state is logically the lowest power state, and is a soft OFF mode that requires a complete boot-up when awakened.

In accordance with an embodiment, an intermediate power state is provided between the S2 and S3 power states. This is a low power mode and non-ACPI-defined power state, which is labeled in FIG. 4 as the power state "S2.5." The label "S2.5" is used herein merely for the sake of convenience and ease of explanation and to provide context, and is not intended to limit the invention to strictly an ACPI environment.

In an embodiment of the S2.5 power state, most of the components of the portable computer 100 are turned OFF. However, a low power mode application (such as components usable with an email application) is operating, and the various components of the portable computer 100 that are usable to support operation of that low power mode application are selectively ON or otherwise running, until such components are no longer needed during operation of the low power mode application (in which case such components are then turned OFF). The speed of the clock in the high-power processing unit 304 is also reduced to a minimum low speed to support the low power mode application. For instance, the speed of the clock during the low power mode can be set to a minimum speed that is specified for the high-power processing unit 304, a non-limiting and purely illustrative example of which is approximately 433 MHz. As such, for transitioning to and operating in the S2.5 power state, the sequence and duration of turning OFF certain unnecessary components can minimize power consumption. Moreover, the portable computer 100 will not be awakened from the S2.5 power state by any basic interrupt (as contrasted with the S1 or S2 power states). Rather, only specific events will cause a transition to a higher power state (e.g., S0), such as opening the lid of the portable computer 100. Further details of low power mode operation in the S2.5 power state, including transitioning to and from the low power mode, are provided below.

Figure 5:
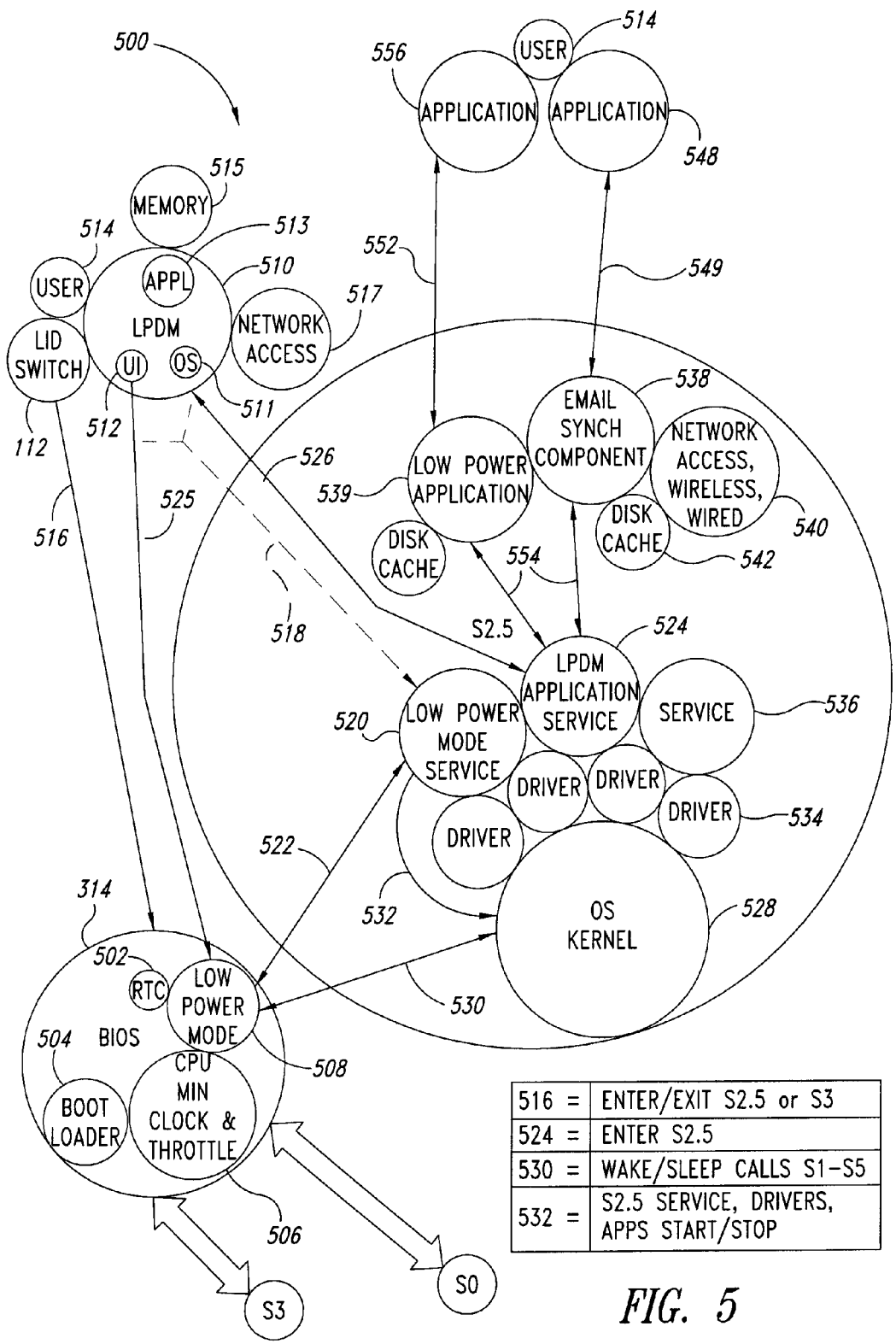
FIG. 5 is a diagrammatic representation of interaction and operation of various components of the portable computer in view of the power states of FIG. 4, according to one embodiment.

FIG. 5 is a diagrammatic representation 500 illustrating the interaction and operation of various components of the portable computer 100 in view of the power states of FIG. 4, according to one embodiment. More particularly, the diagrammatic representation 500 illustrates operation of the portable computer 100 in the low power mode (i.e., the S2.5 power state).

The BIOS 314 includes a real time clock (RTC) 502, a bootloader 504, and a CPU minimum clock and throttle 506. According to one embodiment, the BIOS 314 includes a low power mode subsystem 508, which interacts with other low power mode components to control and manage transitions to and from the S2.5 power state, and to manage and control the switching of certain components (generally hardware-related components) OFF or ON in connection with low power mode operation. The low power mode subsystem 508 can be embodied in software source code, software object code, or other machine-readable instructions. In one embodiment, the CPU minimum clock and throttle 506 can be used to set or otherwise control the timing interval to transition from an S3 standby power state, for example, into the low power mode for purposes of polling for new email. Furthermore, the BIOS 314 can control and manage transitions into and, out of the S0 and S3 power states, as indicated in FIG. 5.

Transitioning or otherwise entering into the S2.5 power state (or also entering the S3 power state) according to one embodiment can be performed by closing the lid of the portable computer 100, thereby triggering or otherwise activating the lid switch 112. Additionally, exiting the S2.5 power state (or also exiting the S3 power state) can be performed by opening the lid of the portable computer 100, which also triggers a change in state of the lid switch 112. An arrow 516 in FIG. 5 represents the entering into and exiting from the S2.5 power state. The arrow 516 indicates that the entering/exiting may be performed by a BIOS call, an interrupt, or other communication to the BIOS 314 from the lid switch 112. When entering the low power mode of the S2.5 power state, the low power mode subsystem 508 of the BIOS 314 then wakes up a low power mode service 520 (indicated by an arrow 522). Alternatively or additionally, a broken arrow 518 represents that the transition to or from the S2.5 power state can be performed by a direct communication (as a result of activation of the lid switch 112) to the low power mode service 520 from the lid switch 112.

In an embodiment, entering the S2.5 power state also can be performed via a low power display module (LPDM) 510 that includes the low power display 114. The LPDM 510 includes a user interface 512 (which can be embodied as controls, buttons, or menus on the low power display 114) that can communicate (indicated with an arrow 525) with the low power mode subsystem 508 of the BIOS 314 to initiate transition into the S2.5 power state. Alternatively or additionally, the user interface 512 or other component of the LPDM 510 can communicate directly with the low power mode service 520 (also represented by the broken arrow 518) to initiate transition into the S2.5 power state. Further alternatively or in addition, the LPDM 510 (including its user interface 512) can communicate with an LPDM application service 524 (indicated by an arrow 526) to initiate transition into the S2.5 power state or to otherwise present information during the low power mode (such as presentation of email on the low power display 114). A user 514 can operate the lid switch 112 or the LPDM 510 to trigger a transition into the full power mode or any of the low power modes.

According to various embodiments, the LPDM 510 can include its own operating system 511 that can operate in conjunction with the low-power processing unit 310 of the LPDM 510. The LPDM 510 can also include one or more applications 513 and a memory 515, such as a cache. An example of the application 513 is an application to perform bi-directional synchronization of email between email content of the memory 515 and email content present in the system memory 306 (and/or at the server 350). The application 513 can also provide functionality for the user interface 512, such as rendering an in box on the low power display 114, allowing emails listed in the inbox to be opened, deleted, moved, etc., and other email-related operations. According to an embodiment, the LPDM 510 can also include or otherwise be operatively coupled to its own network access device 517 (such as a transceiver 348 or network interface 346), so that the LPDM 510 can perform email polling/retrieval alternatively or additionally to the email polling/retrieval performed by the high-power processing unit 304 during the low power mode.

The low power mode service 520 of one embodiment comprises a service, program, component, subroutine, module, or other software code or set of machine-readable instructions that is always running. In the S0 power state, the low power mode service 520 is running but is basically performing a minimal amount of tasks, or more specifically, the low power mode service 520 is monitoring for certain activities that signal a need to transition to the S2.5 power state. An example of such a monitored activity is activation of the lid switch 112, which indicates a closing or opening of the lid of the portable computer 100.

When the lid is closed or some other activity signals a need to transition to the low power mode of the S2.5 state, the low power mode service 520 wakes up or otherwise becomes more active, and determines which low power mode application is to be made active in the low power mode (if any); determines the hardware, software, and power needs for that low power mode application from information provided by the low power mode application and/or from power profiles comprising part of the program data 324; communicates with either or both the BIOS 314 or with an operating system kernel 528 (as indicated by an arrow 532) to turn certain elements OFF in a specific sequence; or otherwise performs tasks associated with operating the portable computer 100 in the low power mode. The arrow 522 also represents this communication to the BIOS 314 by the low power mode service 520, and an arrow 532 represents the communication to the operating system kernel 528 by the low power mode service 520. The operating system kernel 528 and/or the BIOS 314 can then selectively begin powering down unnecessary hardware, software, services, and other elements. In the context of email in one embodiment, the arrow 522 also represents the turning ON and OFF of the low power mode subsystem 508 of the BIOS 314, to allow activation and deactivation of elements of the portable computer 100 (such as the transceiver 348) that are used for periodic polling of an external server (such as the server 350) for new email.

In an embodiment, the low power mode service 520 sends a suspend-until-resume (as compared to suspend-until-interrupt) message to either or both the operating system kernel 528 and the BIOS 314, so as to suspend tasks that are not needed or unused during the low power mode. When a resume signal is sent from the low power mode service 520, the suspended tasks are resumed from the point where they were suspended. It is noted that an embodiment removes these tasks from suspension with a resume signal, as compared to an interrupt. An interrupt often removes elements from a standby state in existing systems. However, with an embodiment, interrupts are generated while operating in the low power mode, and therefore, resume signals rather than interrupts are used to remove elements from suspension to ensure that such elements remain suspended during the low power mode and do not perform unnecessary tasks (and therefore unnecessarily consume power).

The low power mode service 520 can comprise part of the program/modules 324 shown in FIG. 3. In one embodiment, the low power mode service 520 comprises a service that can be written using the Microsoft Win32 Software Development Kit (SDK), so as to allow the service to interact and interface with the operating system kernel 528. The operating system kernel 528, such as a Windows XP™ kernel, can in turn comprise part of the overall operating system 320.

In the case of the operating system kernel 528, it can make calls to the BIOS 314 to turn ON or turn OFF certain elements during the S1-S5 power states, as represented by an arrow 530. In one embodiment, this includes direct BIOS calls to the low power mode subsystem 508 to turn OFF certain hardware elements that are not necessary for the low power mode. Alternatively or additionally, the operating system kernel 528 can turn OFF certain software elements, such as unnecessary services 536 or applications, by turning OFF their corresponding drivers 534. The operating system kernel 528 can also selectively turn ON such services 536 or applications by activating their drivers 534.

In an embodiment operating in the low power mode, the low power mode service 520 and/or the LPDM application service 524 interact with one or more email synchronization components 538 and with one or more low power applications 539. An embodiment of the low power application 539 is a low power media player disclosed in U.S. application Ser. No. 10/857,627, entitled "LOW POWER MEDIA PLAYER FOR AN ELECTRONIC DEVICE," filed May 28, 2004. The low power application 539 of one embodiment can control or otherwise operate with an installed application 556, such as a media player application, as depicted by an arrow 552.

With respect to an embodiment of the email synchronization component 538, this element can comprise a dynamic link library (DLL), application program, API, executable code, software module, COM server, service, library, or other type of machine-readable instruction. In an embodiment, the email synchronization component 538 can use at least some of the existing functionality and/or features of an application 548 (e.g., an email application, such as Microsoft Outlook™, Eudora™, Lotus Notes™, and so on) to perform email retrieval and caching or other email-related operations. An arrow 549 depicts this cooperation between the application 548 and the email synchronization component 538. In another embodiment, the email synchronization component 538 can be provided with its own mail retrieval mechanism and other email-related functionality, instead of using the functionality in the application 548.

Figure 7:
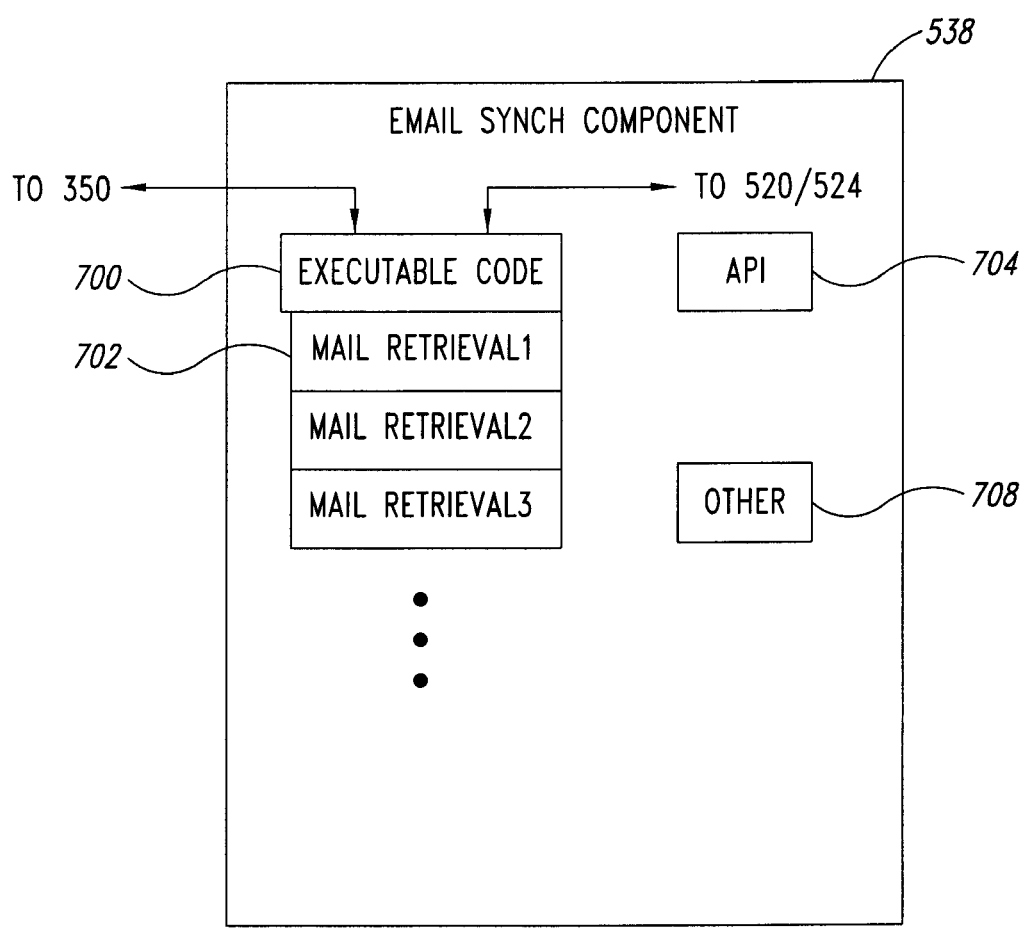
FIG. 7 is a block diagram showing an embodiment of the email synchronization component of FIG. 5 in more detail.

One embodiment of the synchronization component 538 is shown in FIG. 7. The email synchronization component 538 includes executable code 700 that uses one or more mail retrieval mechanisms 702 to poll or otherwise obtain new email from the server 350 or other email source. The mail retrieval mechanism(s) 702 can include, for example, any one or more of MAPI, POP3, IMAP, HTTP, or any other mail retrieval mechanism. The executable code 700 can also include functionality for placing the retrieved email in a local storage location (such as the RAM 312) and for performing synchronization or other communication with the LPDM 510. This communication with the LPDM 510 can be performed via the LPDM application service 524 (indicated by an arrow 554 in FIG. 5) and/or via the low power mode service 520 and/or directly therewith.

The email synchronization component 538 can further include any one or more of an API 704 or other component(s) 708 to support email-related operations associated with polling, caching, synchronizing, and the like.

In an embodiment, a network access component 540 (either or both wireless or wired) can be selectively activated during the low power mode. Examples of the network access component 540 include the transceiver 348 or the network interface 346. The email synchronization component 538 can use the network access component 540 to check the server 350 and then download any new email into a disk cache 542 or other suitable volatile memory location as needed during the low power mode, wherein the disk cache 542 can comprise part of the RAM 312 or other storage unit.

Figure 6:
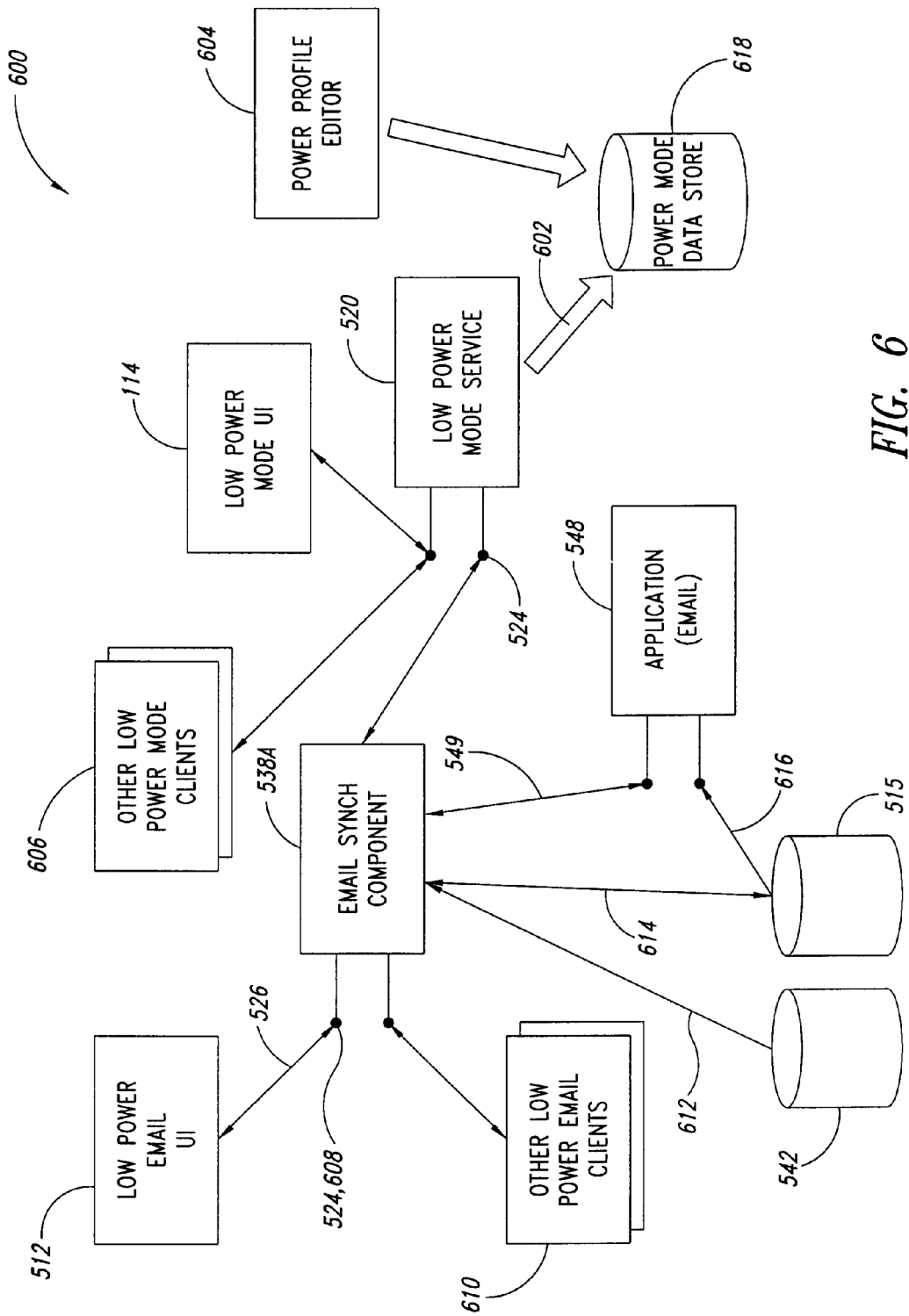
FIG. 6 is a block diagram that illustrates operation of an email synchronization component of FIG. 5 in conjunction with other components of the portable computer, according to one embodiment.

FIG. 6 is a block diagram 600 that illustrates operation of the email synchronization component 538 in conjunction with other components of the portable computer 100, according to one embodiment. Certain elements from the diagrammatic representation 500 of FIG. 5 are also shown in the block diagram 600 so as to provide context.

First, the low power mode service 520 is shown. The low power mode service 520 uses information from a power mode data store 618, which includes the program data 326 shown in FIG. 3, to determine which elements of the portable computer 100 should be kept turned ON or turned OFF, and to determine the power needs of certain elements for certain applications or operations. The sequence and duration for turning such elements ON or OFF can be stored in and obtained from the power mode data store 618. In an embodiment, the power mode data store 618 can include information such as the power requirements for the transceiver 348 and/or network interface 346 so that these components can communicate with the server 350 to obtain new email, identification of the resources that need to be turned ON during operation of the application 548 and/or the email synchronization component 538 during the low power mode, power requirements of such resources, when such resources need to be turned ON/OFF and any corresponding duration, and other information associated with operation of the email synchronization component 538 and/or application 548. An arrow 602 represents the capability of the low power mode service 520 to obtain this information from the power mode data store 618. A power profile editor 604 or other tool can be provided to add, modify, or remove any of the power profile information in the power mode data store 618.

The low power mode service 520 can control or otherwise communicate with a plurality of different clients 606. Such clients 606 can include the low power application 539, for example a low power media player. The low power mode service 520 can further communicate with a low power mode user interface, such as a user interface on the low power display 114 via the LPDM application service 524 or directly thereto. The low power mode service 520 can also communicate directly (or via the LPDM application service 524) with the email synchronization component 538.

Through the LPDM application service 524 and/or an API 608, the email synchronization component 538 can communicate with the user interface 512 of the LPDM 510, to present email on the user interface 512.

There may be other clients 610 with which the email synchronization component 538 interacts during its operation in the low power mode. Some of these clients 610 include the hard disk drive 316, the hard disk 318, the high-power processing unit 304, the operating system 320, and/or other components. As shown in FIG. 6, the email synchronization component 538 can also communicate with the application 548 (such as an email application) if certain features of the application 548 are being used for purposes of email retrieval, synchronization, presentation of email, and the like.

Email retrieval and synchronization is illustrated in FIG. 6. The email synchronization component 538 uses the mail retrieval mechanism of the application 548 to poll the server 350 for the purpose of determining if new email is available. If new email is available, then the email synchronization component 538 will then download and store at least a portion of the new email in the disk cache 542, which is located in the first portion 102 of the portable computer 100. This polling and storing can be performed in a full power mode, in the low power mode (e.g., when certain components of the portable computer 100 are awakened from the standby state, so that such components can perform the polling), or in any other operative power mode of the high-power processing unit 304.

To synchronize, the email synchronization component 538 replicates at least some of the contents of the disk cache 542 into the memory 515, which is located in the LPDM 510. This synchronization may also be performed during the full power mode, the low power mode, or any other operative power mode. Arrows 612 and 614 depict this synchronization. The arrows 612 and 614 of one embodiment are bi-directional to represent that the synchronization can also be performed from the memory 515 to the disk cache 542.

Figure 8:
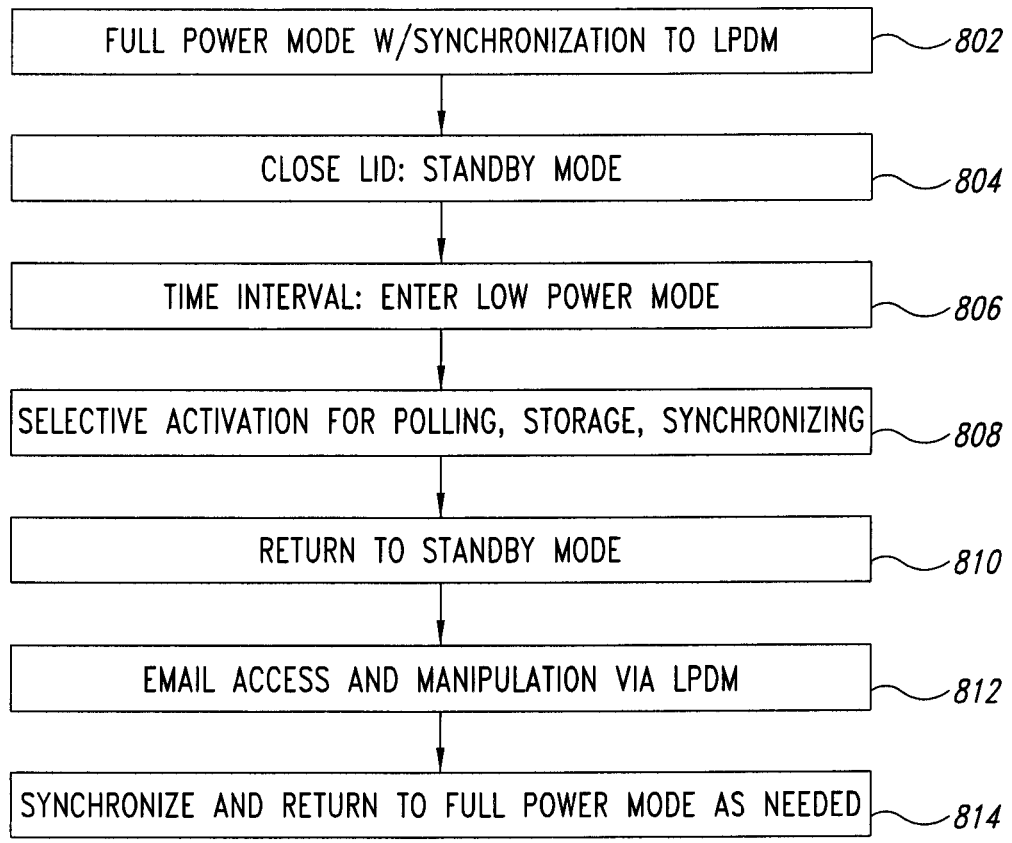
FIG. 8 is a flowchart illustrating operation of the low power email application according to one embodiment.

FIG. 8 shows a flowchart 800 illustrating the manner in which email can be provided during the low power mode in accordance with one embodiment. Features represented by the flowchart 800 can be embodied in software source, software object code, or in other machine-readable instructions stored on a machine-readable medium. The various operations need not necessarily be performed in the exact order shown, and some operations can be added, removed, modified, or combined.

In a block 802, the portable computer 100 may be operating in a full power mode. In this block, the lid of the portable computer 100 is open, and the user is actively using one or more applications, such as the email application 548 or some other application. The email retrieval mechanism of the application 548 may be retrieving new emails from the server 350 or other email source. During this full power mode, the email synchronization component 538 can perform email synchronization to replicate at least some of the retrieved email stored in the disk cache 542 into the memory 515 in the LPDM 510.

At a block 804, the portable computer 100 transitions into the standby mode or other substantially inoperative mode. In one embodiment, closing the lid of the portable computer 100 triggers this transition. While in the standby mode, the clock and throttle 506 of the high-power processing unit 304, user-defined settings, or other mechanism(s) are used to monitor the next time interval when the portable computer 100 is to transition from the standby mode to the low power mode. When that particular time interval arrives, the portable computer 100 transitions into the low power mode at a block 806.

At the block 806, the low power mode service 520 performs certain tasks to transition into the low power mode. These tasks include reading the low power mode power profile from the power mode data store 618, and determining which elements of the portable computer 100 to turn OFF, to keep turned ON, when to turn them OFF or ON, in which sequence, duration, and so forth in connection with polling for and retrieving email, storing retrieved email, and/or synchronizing. The devices, services, processes, and other components that are unused for email polling, storing, and/or synchronizing are kept turned OFF and/or suspended. In an embodiment, the transition into the low-power mode involves selective activation of components that operate in conjunction with the high-power processing unit 304, such that the high-power processing unit 304 can control activation of the transceiver 348 and/or network interface 346 to retrieve email, storage of retrieved emails in the disk cache 542, and/or activation of the email synchronization component 538 so that this component can synchronize the contents of the disk cache 542 with the contents of the memory 515 in the LPDM 510.

In another embodiment, transition into the low power mode can involve activation of the email synchronization component 538, without activation of other components associated with the high-power processing unit 304 (such as the transceiver 348). For instance, in an embodiment where the LPDM 510 is provided with its own network access device 517, the email synchronization component 538 can cooperate with that network access device 517 to download new email directly into the memory 515 without requiring an intermediate download into the disk cache 542.

The polling and retrieval, storage, and/or synchronization are performed at a block 808. After completing the operations at the block 808, the portable computer 100 can return to the standby mode or otherwise return to a substantially inoperative power state of the high-power processing unit 304. At this point, the newly downloaded emails or portions thereof, if any, have been copied into the memory 515 and can be accessed and viewed at least in part via the LPDM 510.

For example at a block 812, the low-power processing unit 310 is operating and controlling the LPDM 510. The LPDM 510 can display (on the user interface 512) an inbox having the new emails, such as subject, sender, date, or other portions of the email. The user can choose to read, delete, save, move, or perform other operations to access and manipulate the emails. For instance, the user can choose to read just the displayed portion of the email, and decide to defer reading the entire email until later. The user may also instead choose to read the entire email after reading the portion displayed on the user interface 512. In such a case, the user can open the lid of the portable computer 100, thereby causing the portable computer 100 to transition into the full power mode. The particular email can then be displayed and read on the display screen 108.

When the portable computer 100 transitions back into the full power mode or other operative power mode (such as the low power mode), synchronization can be performed as needed by the email synchronization component 538 at the block 814. For instance, if the user deleted or moved emails via the LPDM 510, then the contents of the memory 515 are replicated by the email synchronization component 538 in the disk cache 542 and/or at the server 350. Transitioning back to an operative power mode at the block 814 can be caused by several possible actions, such as opening the lid of the portable computer 100, user-activation of one or more buttons or commands, or other actions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible and can be made without deviating from the spirit and scope of the invention.

For example, while some embodiments have been described in the context of interacting with a Windows XP™ kernel and operating in conjunction with the power states defined in the ACPI specification, the invention is not limited to these specific implementations. Other embodiments may be implemented with electronic devices that use a different operating system and/or that have power states that are defined using some other specification.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable for an electronic device that can operate in a standby mode, a low power mode, and a higher power mode, wherein the standby mode uses less power than the low power mode and the low power mode uses less power than the higher power mode, the method comprising:
    in the higher power mode, operating an email application to obtain at least a portion of a first email under control of a first processor in a high power processing module;
    displaying the portion of the first email on a first display controlled by the high power processing module using the first processor, wherein the first display is viewable when the electronic device is in an open configuration;
    transitioning the electronic device to the standby mode, wherein transitioning includes deactivating or reducing power to the high power processing module;
    monitoring for an event representative of a transition from the standby mode to the low power mode or from the higher power mode to the low power mode;
    in response to detecting the event, activating an email component to operate during the low power mode;
    using the email component to obtain at least a portion of a second email during the low power mode;
    loading the portion of the second email to a memory associated with a low power processing module separate from the high power processing module by a second processor in the low power processing module; and
    using the second processor, displaying the loaded portion of the second email from the memory on a second display controlled by the low power processing module, wherein the second display is viewable when the electronic device is in a closed configuration.

2. The method of claim 1 wherein displaying the loaded portion of the second email comprises displaying the portion of the second email in a user interface controllable by the low-power processing module and separate from a user interface controllable by the high power processing module, and wherein the electronic device has a lid and the first display is located on an inside surface of the lid, and wherein the second display is physically separate from the first display and the second display is located on an outside surface of the lid.

3. The method of claim 1, further comprising:
    deactivating at least a first component of the electronic device that is to be unused for obtaining the portion of the second email during the low power mode;
    activating at least a second component of the electronic device that is to be used in conjunction with the email component for obtaining the portion of the second email during the low power mode; and
    deactivating the second component after the portion of the second email is obtained.

4. The method of claim 1 wherein displaying the loaded portion of the second email from the memory includes displaying the loaded portion of the second email while other components of the electronic device are at a inoperative power state.

5. The method of claim 1 wherein: obtaining at least the portion of the second email during the low power mode includes downloading the portion of the second email to a storage location using a delivery mechanism of an email application installed in the electronic device; and wherein if the downloaded portion of the second email includes content, loading in the memory the portion of the second email includes synchronizing at least some of the email content in the storage location to the memory.

6. The method of claim 5, further comprising synchronizing email contents in the memory to the storage location, after user manipulation of the email contents in the memory.

7. The method of claim 1 wherein using the email component to obtain the portion of the second email during the low power mode includes using the email component along with a selectively activated network access device of the electronic device to obtain the portion of the second email.

8. The method of claim 7 wherein the network access device is associated with the low-power processing module of the electronic device and is different from a network access device associated with the high power processing module of the electronic device.

9. An article of manufacture usable for a portable electronic device that can operate in a standby mode, a low power mode, and a higher power mode, wherein the standby mode uses less power than the low power mode and the low power mode uses less power than the higher power mode, the article of manufacture comprising:
a non-transitory machine-readable storage medium storing instructions thereon to cause a processor to process email during a low power mode, by:
in the higher power mode, operating an email application to obtain at least a portion of a first email under control of a high power processing module;
displaying the portion of the first email on a first display controlled by the high power processing module, wherein the first display is viewable when the electronic device is in a first configuration;
transitioning the portable electronic device to the standby mode, wherein transitioning includes deactivating or reducing power to the high power processing module;
monitoring for an event representative of a transition from the standby mode to the low power mode or from the higher power mode to the low power mode;
in response to detecting the event, activating an email component to operate during the low power mode;
using the email component to obtain at least a portion of a second email during the low power mode;
loading the portion of the second email to a memory associated with a low power processing module separate from the high power processing module; and
presenting the loaded portion of the second email from the memory on a second display associated with the low power processing module, wherein the second display is physically separate from the first display and wherein the second display is viewable when the electronic device is in a second configuration.

10. The article of manufacture of claim 9 wherein the machine-readable storage medium further includes instructions stored thereon to:
deactivate at least a first component of the portable electronic device that is to be unused for obtaining the portion of the second email during the low power mode;
activate at least a second component of the portable electronic device that is to be used in conjunction with the email component for obtaining the portion of the second email during the low power mode; and
deactivate the second component after the portion of the second email is obtained.

11. The article of manufacture of claim 9 wherein the instructions for monitoring for the event representative of the transition to the low power mode includes instructions for monitoring for a time interval when the transition to the low power mode is scheduled to occur, and wherein the electronic device has a lid and the first display is located on an inside surface of the lid and viewable in the first position, and wherein the second display is located on an outside surface of the lid and viewable in the second position.

12. The article of manufacture of claim 9 wherein the machine-readable storage medium further includes instructions stored thereon to:
download the portion of the second email to a storage location using a delivery mechanism of an email application installed in the portable electronic device; and
synchronize at least some email content in the storage location to the memory, including synchronization of the downloaded portion of the second email into the memory.

13. An apparatus that can operate in a standby mode, a low power mode, and a higher power mode, wherein the standby mode uses less power than the low power mode and the low power mode uses less power than the higher power mode, the apparatus comprising:
a network access device;
an email component operable to communicate with the network access device to obtain at least a portion of an email during the higher power mode or the low power mode, to be inactive during the standby mode, and to transition to the low power mode in response to an event representative of a transition from the standby mode to the low power mode or from the higher power mode to the low power mode;
a memory communicatively coupled to the email component to store the obtained portion of the email;
a high-power processing unit configured to control the display of the portion of the email during the higher power mode;
a first display associated with the high power processing module, wherein the high-power processing unit is configured to control the first display to display the portion of the email during the higher power mode;
a low-power processing unit coupled to the memory and configured to control presentation of the portion of the email stored therein during the low power mode or the standby mode;
a second display associated with the low-power processing unit, wherein the second display is physically separate from the first display and wherein the low-power processing unit is configured to control the second display to display the portion of the email during the low power mode; and
a housing, having a lid, for at least partially carrying the network access device, the memory, the high power processing unit, the low power processing unit, the first display, and the second display, wherein the housing is sized to be held within a user's hand, wherein the first display is located on an inside surface of the lid, and wherein the second display is located on an outside surface of the lid.

14. The apparatus of claim 13, further comprising a user interface controllable by the low-power processing unit to present the portion of the email.

15. The apparatus of claim 14 wherein the memory, low-power processing unit, and the user interface comprise part of a low power display module that can operate independently of other components of the apparatus.

16. The apparatus of claim 13, wherein the high-power processing unit can be transitioned into the low power mode to control the email component and the network access device to obtain the portion of the email.

17. The apparatus of claim 13, further comprising a storage location to store the obtained portion of the email, wherein the email component can perform synchronization between the storage location and the memory to match at least some of their email content.

18. The apparatus of claim 13, further comprising an application and an operating system associated with the low-power processing unit to cooperate with the low-power processing unit to present the portion of the email.

19. The apparatus of claim 13, further comprising an email application having a mail retrieval mechanism usable by the email component to obtain the portion of the email during the low power mode.

20. A system that can operate in a standby mode, a low power mode, and a higher power mode, wherein the standby mode uses less power than the low power mode and the low power mode uses less power than the higher power mode, the system comprising:

means for operating, in the higher power mode, an email application to obtain at least a portion of a first e-mail under control of a first processor in a high power processing module;

means for displaying the portion of the first email on a first display controlled by the high power processing module using the first processor, wherein the first display is viewable when the electronic device is in an open configuration;

means for transitioning the electronic device to the standby mode, wherein transitioning includes deactivating or substantially reducing power to the high power processing module;

means for monitoring for an event representative of a transition from the standby mode to the low power mode or from the higher power mode to the low power mode;

means for activating an email component to operate during the low power mode in response to detecting the event;

means for using the email component to obtain at least a portion of a second email during the low power mode;

means for loading the portion of the second email to a memory associated with a low power processing module separate from the high power processing module by a second processor in the low power processing module; and means for using the second processor to display the loaded portion of the second email from the memory on a second display controlled by the low power processing module, wherein the second display is viewable when the electronic device is in a closed configuration.

* * * * *

UNITED STATES PATENT AND TRADEMARK OFFICE
CERTIFICATE OF CORRECTION

| | | |
|---|---|---|
| PATENT NO. | : 7,996,480 B2 | |
| APPLICATION NO. | : 12/724577 | |
| DATED | : August 9, 2011 | |
| INVENTOR(S) | : Rod G. Fleck et al. | |

It is certified that error appears in the above-identified patent and that said Letters Patent is hereby corrected as shown below:

In column 12, line 16, delete "and," and insert -- and --, therefor.

In column 13, line 1, delete "in box" and insert -- inbox --, therefor.

Signed and Sealed this
Twentieth Day of December, 2011

David J. Kappos
*Director of the United States Patent and Trademark Office*